Figure 1:
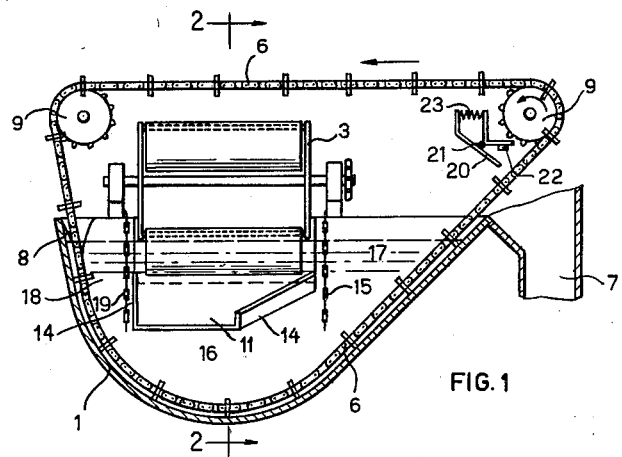

Jan. 9, 1962 J. N. J. LEEMAN 3,016,144
APPARATUS FOR SEPARATING MIXTURES OF SOLID PARTICLES
Filed Jan. 2, 1959

JAN N. J. LEEMAN

BY: Cushman, Darby & Cushman
ATTORNEYS

United States Patent Office 3,016,144
Patented Jan. 9, 1962

3,016,144
APPARATUS FOR SEPARATING MIXTURES OF SOLID PARTICLES
Jan N. J. Leeman, Brunssum, Netherlands, assignor to Stamicarbon N.V., Heerlen, Netherlands
Filed Jan. 2, 1959, Ser. No. 784,747
Claims priority, application Netherlands Jan. 3, 1958
6 Claims. (Cl. 209—172.5)

This invention relates to an apparatus for separating mixtures of solid particles into fractions of different specific gravities by the float-and-sink method. More particularly, the invention relates to an improvement with respect to that type of float-and-sink apparatus which comprises a tank for receiving a separating bath, a partition wall dividing said tank into compartments, means for introducing the mixture to be separated into one of the said compartments, means for discharging the floating particles from the said compartment, and conveyor means for removing the settled particles from the tank.

In apparatus of the aforesaid type employed hitherto, the particles settled in the feed compartment have been discharged by means of a conveyor, such as a spiral conveyor or an endless scraper conveyor, which moves along the bottom of the tank, to a second compartment from where they are finally discharged. In order to prevent lighter particles in the feed compartment from passing to the second compartment, both compartments are separated by a partition wall which is vertically disposed in the tank and has its lower edge spaced above the conveyor to define a passage for the settled particles.

The distance between the bottom of the tank and the lower edge of the partition wall has to be so great that the opening cannot get blocked and the conveying element and the partition wall cannot be damaged by settled particles passing through the opening. In dimensioning the opening it should be kept in mind that some of the settled particles passing through it may lie on top of each other. In particular if a material containing large and heavy lumps, e.g., lump coal, is to be separated into fractions, the opening has to be made rather high. This implies that the lower edge of the partition wall is at quite a distance from the conveyor, so that particles of the light fraction easily get into the discharge compartment for the heavy fraction through the opening. To prevent blockage of the passage the partition wall may be arranged hingingly on a horizontal axis in the washing tank. However, if in this case a big piece of shale passes through the opening, causing the partition wall to turn, such a motion is imparted to the liquid in the feed compartment that the separation is unfavourably affected.

In case an endless scraper chain has been provided for discharging the settled particles, it has been proposed to arrange a partition wall between the feed compartment and the part of the tank where the lower reach of the conveyor dips into the tank. The principal object of this partition wall is to prevent lighter particles of the mixture introduced into the bath from being entrained by the descending conveyor reach towards the discharge for the settled particles. However, such a partition wall hinders the inspection and repair of the scraper guides and the installation of a new conveyor.

It is therefore an object of the present invention to provide a novel, simple, and efficient apparatus for the separation of mixtures of solid particles according to specific gravity.

Another object of the invention is to provide an apparatus for the separation of mixtures of solid particles in which big pieces of material are present.

Still another object of the invention is to provide an apparatus for the separation of solid particles which produces fractions of high purity.

A further object of the invention is to provide an apparatus for the separation of solid particles in which the light particles are prevented from passing to the discharge for the heavy particles, or in which this passage is at least hindered.

A further object of the invention is to provide an apparatus for the separation of solid particles in which no disturbances are caused in the separatory bath which might affect the separation unfavourably.

A further object of the invention is to provide an apparatus for the separation of solid particles in which the guides for the conveying element are easily accessible for inspection and repair.

Still another object of the invention is to provide an apparatus for the separation of solid particles in which damaging of the conveyor means or of parts of the separatory tank by big pieces of material to be separated is prevented.

With these objects in view, an apparatus has been designed in which the separating tank is divided into compartments by means of a partition wall which consists of flexible elements, such as chains or cables, suspended beside each other in the tank.

Figure 2:
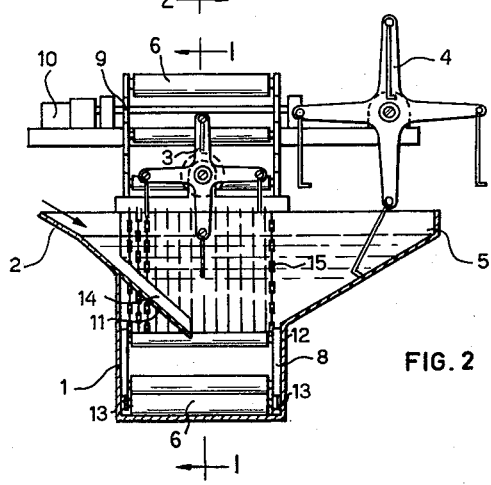

These and other objects of the invention will be apparent from the following specification and the accompanying drawings, in which drawings:

FIGURE 1 is a longitudinal section of a separatory tank of the present invention taken along the line 1—1 of FIGURE 2; and FIGURE 2 is a vertical cross section of this separatory tank taken along the line 2—2 of FIGURE 1.

Referring specifically to the drawings wherein like characters represent like parts, reference numeral 1 designates a tank in which the float-and-sink separation takes place. The material to be separated, e.g., raw lump coal in the size range 80–800 mm., is supplied to the said tank through a chute 2. The tank is filled with a suspension, e.g., magnetite in water, whose specific gravity is intermediate between that of the coal and that of the shale. The coal floats on this suspension and is propelled to the discharge 7 by suitable means, e.g., paddle wheels 3 and 4. The shale sinks to the bottom of the tank and is transported to the discharge 7 along the sloping bottom of the tank by an endless scraper conveyor 6.

The scraper conveyor is guided in the washing tank by guides 8, and over the tank it is led over return wheels 9, which are driven by a motor 10 in the direction indicated by the arrow in FIGURE 1.

Under the feed chute 2 a sloping plate 11 is arranged, which gradually narrows in the direction of the opposite side wall 12 of tank 1. The heavy particles slide down along this plate and are scattered over the width of the tank, owing to the narrowing of the plate. As a result, the material to be separated is more equally distributed in the separating bath and the settled pieces will be evenly distributed between the chains 13 of the scraper conveyor 6. Consequently the two chains 13 of the endless scraper conveyor are equally loaded, so that the scrapers are not distorted, which results in a decrease of the wear of the scraper guides 8. The side edges of the plate 11 are provided with raised side edge plates 14, which prevent the heavy particles from falling sideways off the plate 11.

In the tank a row of chains 15 is suspended, which divides the washing tank into a deep separation compartment 16, and a shallow sink discharge compartment 17. The lump coal to be separated is fed into the separation compartment 16, from which the floating washed coal is discharged at the top by means of the paddle wheels 3 and 4. The shale particles settling in the compartment 16 are transported by the lower reach of the scraper conveyor 6 to the shallow compartment 17, and from there to the shale discharge chute 7.

The curtain of chains 15 define openings therebetween which, in their normal operative suspended condition, are of a size less than the size of the particles to be separated. The chains thus prevent the coal particles floating on the surface of the bath in the separation compartment 16 from getting into shallow compartment 17 and being discharged with the shale. The lower ends of the chains 15 may be immediately over the scraper conveyor 6, so that also particles of low specific gravity which in the supply stream have penetrated too deep in the bath, cannot escape under the chains 15 into the shale discharge compartment 17.

When large pieces of shale are being discharged or when some pieces are lying on top of each other in the scraper conveyor, they may pass unhindered under the chain curtain 15, as the chains which such a large piece meets on its way will slide across or past it. As the higher parts of these chains 15 remain substantially vertical, the separation between the two compartments remains intact and no appreciable liquid currents, which might have an unfavourable influence on the separation, are generated in the separation compartment 16.

Instead of one row of chains 15, several rows may be arranged between the compartments 16 and 17. When the feed contains also fine particles, the rows of chains hanging in tank 1 may be formed alternately by heavy and light chains. The flexible elements constituting the curtain between the compartments may also consist of cables. If necessary the chains or cables may be weighted at their lower ends.

Between the deep compartment 16 and the part 18 of the tank where the conveyor 6 enters the tank one or more further rows of chains 19 are suspended. This curtain of chains prevents particles floating on or in the suspension in the deep compartment 16 from being entrained by the descending scrapers and being discharged with the shale. Furthermore it enables repairs to be carried out to the guides 8 without the partition 19 having to be taken out of the tank.

The flexible elements are bent upwards or sideways in this case, so that the guides are easily accessible. The flexible elements hanging down in the tank may be united into a network by means of cross links.

As compared with a rigid partition wall, the flexible one has the advantage that during operation the conveyor cannot be damaged by pieces of the mixture to be separated, e.g. pieces which have the same or about the same specific gravity as the separatory suspension and have passed under the lower edge of the partition wall into the compartment 18.

Over the discharge chute 7 for the shale there is mounted a plate or beam 20, extending over the full width of tank 1. Large pieces of shale that have remained on the scrapers strike against this beam which acts as an abutment, in consequence of which they are tipped and fall between the scrapers. In this way damaging of the reversing wheels 9 and dropping of the shale pieces beside or at too high a rate into the discharge chute 7 are prevented. As a rule the large pieces of shale are oblong, so that they drop down after turning through a small angle. In order to facilitate this turning, the plate or beam may be disposed at an oblique angle to the direction of motion of the scraper chain. It is also possible to use pins or suchlike devices for tipping the pieces of shale.

It will seldom occur that a piece of shale is so clamped between the scrapers that it cannot be turned by the beam. However, in order to prevent that in these sporadic cases the scrapers or tipping elements get damaged, the beam is hingingly supported at 21, and coupled to a switch 22. If now a piece of shale clamped between the scrapers strikes against the beam 20, this beam yields against the action of a spring 23, so that the switch is operated and the driving motor 10 of the scraper conveyor is switched off. Details of the switch are not shown in the drawings, as the construction is of a known mechanical or electrical type. After removal of the obstacle, the driving gear may be switched on again.

The terminology used in the specification is for the purpose of description and not of limitation, the scope of the invention being defined in the claims.

I claim:

1. An apparatus for separating mixtures of solid particles into fractions of different specific gravities by the float and sink method comprising a tank for receiving a separating bath, a partition wall dividing said tank into a separating compartment having a mixture receiving end and an opposed float particle discharging end and a sink discharge compartment between the ends of said separating compartment communicating laterally therewith through a passage formed by the bottom of the tank and the lower edge of said partition wall, means in said separating compartment for guiding sinking particles in the separating bath therein to the central lower portion thereof, conveyor means for moving the particles settling to the central lower portion of the separating compartment through said passage and said sink discharge compartment and outwardly of said tank, and means for discharging floating particles in the separating bath within said separating compartment outwardly of the float discharge end thereof, said partition wall being formed by a row of flexible elements suspended beside each other in the tank and defining openings therebetween in their suspended condition of a size less than the size of the particles to be separated.

2. Apparatus as defined in claim 1 wherein said flexible elements are chains.

3. Apparatus as defined in claim 1 wherein said guide means comprises a downwardly sloping plate disposed in said tank having downwardly converging side edges.

4. Apparatus as defined in claim 3 wherein the side edges of said sloping plate are provided with raised side edge plates.

5. Apparatus as defined in claim 1 wherein said conveyor means comprises an endless scraper conveyor having a portion defining a flight movable along the bottom of said tank through said sink discharge compartment and above a discharge end of the latter and wherein an abutment is provided adjacent the scraper conveyor flight at a position above the discharge end of said sink discharge compartment for engaging and tipping particles carried by the scraper conveyor flight and extending thereabove so that such particles will be properly deposited at the discharge end of said sink discharge compartment.

6. An apparatus as defined in claim 5 wherein said abutment is movably mounted adjacent said conveyor flight and spring means is provided for resiliently urging said abutment into a position to engage particles extending above the scraper conveyor and wherein switch means is provided for actuation by said abutment in response to the movement of the latter against the action of said spring means, actuation of said switch being operable to stop the driving movement of said conveyor.

References Cited in the file of this patent

UNITED STATES PATENTS 2,465,220     Garber _____ Mar. 22, 1949

FOREIGN PATENTS 1,060,923     France _____ Nov. 23, 1953